United States Patent [19]

Olson

[11] Patent Number: 5,042,603
[45] Date of Patent: Aug. 27, 1991

[54] ENGINE AIR INTAKE APPARATUS

[75] Inventor: M. Eugene Olson, Fort Wayne, Ind.

[73] Assignee: Navistar International Transportation Corp., Chicago, Ill.

[21] Appl. No.: 512,701

[22] Filed: Apr. 23, 1990

[51] Int. Cl.⁵ .............................................. B60K 13/02
[52] U.S. Cl. .................................. 180/68.3; 55/385.3; 55/DIG. 28
[58] Field of Search .......................... 180/68.3, 68.1; 55/385.3, 462, 465, DIG. 28

[56] References Cited

U.S. PATENT DOCUMENTS

| | | | |
|---|---|---|---|
| 2,585,220 | 2/1952 | Brezek | 180/68.1 |
| 2,670,055 | 2/1954 | Dorman et al. | 180/68.3 |
| 2,834,419 | 5/1958 | Sebok | 180/68.3 |
| 3,232,368 | 2/1966 | Sullivan | 180/69 |
| 4,212,659 | 7/1980 | Magrini | 55/385.3 |
| 4,535,862 | 8/1985 | LeBlanc | 180/68.1 |
| 4,681,178 | 7/1987 | Brown | 180/68.3 |

OTHER PUBLICATIONS

"Intake Aerodynamics", Seddon and Goldsmith, 1985, pp. 32-36.
"Experimental Investigation of NACA Submerged-Duct Entrances" NACA Report No. NACA/-1-1145.5.

Primary Examiner—David M. Mitchell
Attorney, Agent, or Firm—Dennis K. Sullivan

[57] ABSTRACT

The engine air intake apparatus comprises a planar base plate incorporating a curved duct which lies in the plane of the base member initially and then curves inwardly therethrough. The inwardly curved portion of the duct lies toward a trailing edge of the base plate member and is covered by a cover plate member which seats onto and over the trailing end portion of the base plate member in a parallel plane slightly above the plane of the base plate member. When mounted onto the hood of a vehicle, the leading edge of the base plate member, which is slightly elevated above the level of the hood, provides a leading end splitter plow arrangement to the apparatus for removing hood surface water from the air stream flowing along the hood. The duct incorporates a further water removal apparatus comprising an interior separator plate and drain at the trailing end of the curve within the duct for collecting airborne water particles thereon which are thrown off the air stream by centrifugal force as the air stream negotiates the curve and for eliminating the water particles from within the apparatus.

17 Claims, 4 Drawing Sheets

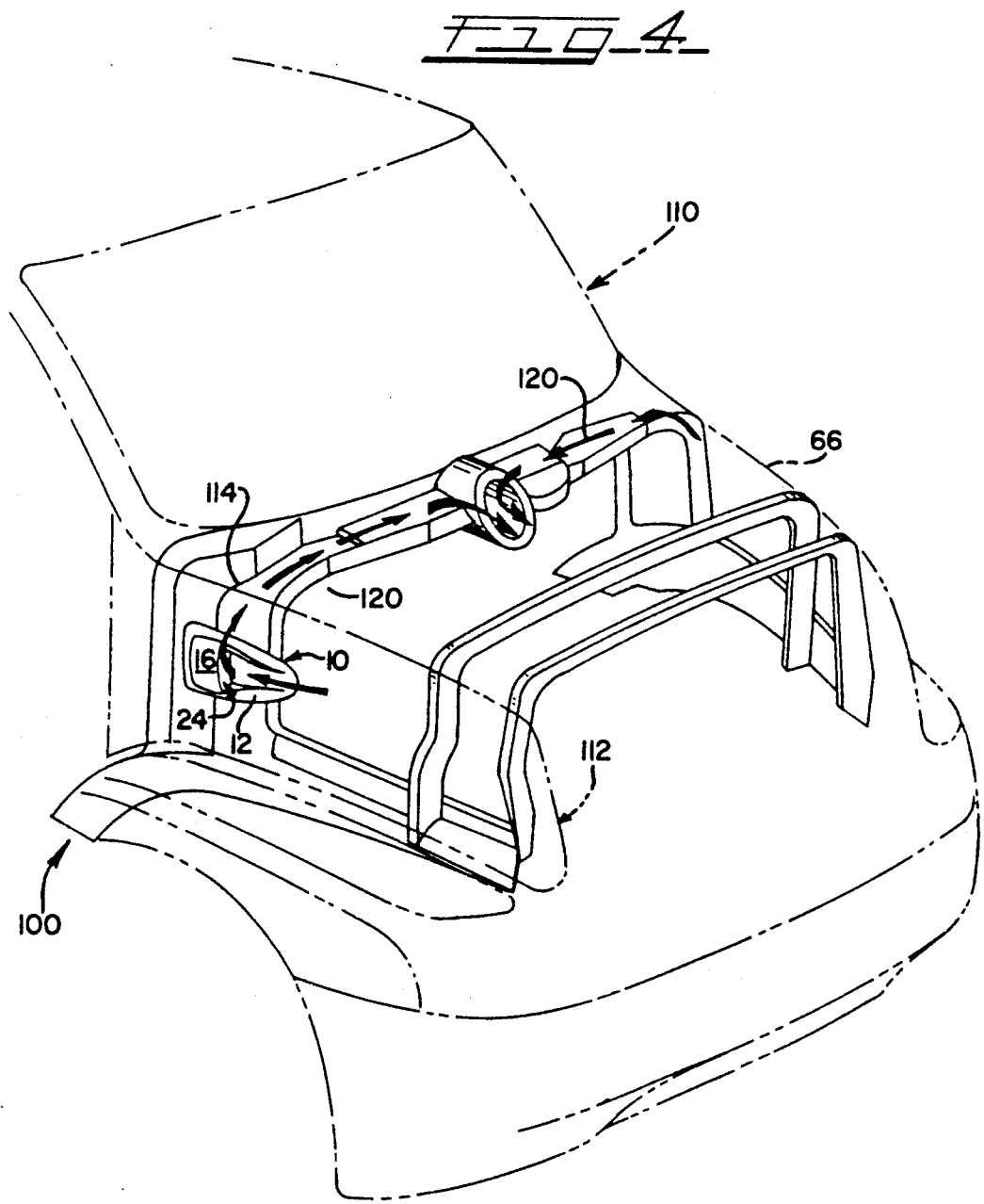

ENGINE AIR INTAKE APPARATUS

BACKGROUND OF THE INVENTION

The present invention relates to an engine air intake apparatus which is mountable on a truck hood for capturing a stream of air to be fed via a duct arrangement within the hood to the engine and, more particularly, to a ram air intake apparatus especially configured to take the required engine airflow into the hood duct with maximum flow efficiency and also minimum aerodynamic drag on the vehicle while removing airborne water from the air stream entering same and preventing hood surface water from entering the duct and engine.

THE PRIOR ART

It is previously known to provide ducts within a truck hood to deliver air from the vehicle exterior to the engine. U.S. Pat. No. 3,232,368 to Sullivan teaches a molded fiberglass hood having a rear reinforcement beam bonded to the skin which defines a duct opening through the skin at the rear portion of the hood sides. Within the engine compartment, the duct interfaces with the engine air cleaner mounted within the engine compartment so that charge air is drawn through the hood duct and the air cleaner into the engine. Ducts such as Sullivan's have been provided with air intake inlets consisting primarily of screened inlets or rear-facing louvers or forwardly facing externally protruding ducts to cause a ram air effect. These existing inlets have not provided for the removal of surface water and airborne water from the charge air as it enters the inlet although systems within the hood ducting and/or air filter to remove moisture are known.

In the field of aeronautics, air intake ducts of specific configuration referred to as NACA ducts or submerged duct entrances have been defined in the National Advisory Council on Aeronautics ARC 5120 (NACA/1-1145.5), released in 1945, although this paper also indicates that these inlets do not have desirable characteristics for use in supplying air to conventional reciprocating engines. Further definition of these ducts may be found in *Intake Aerodynamics*, by Jay Seddon and E. L. Goldsmith, published in 1985 by Collins Publishing, London, at pp. 35-36, wherein the ducts are defined as submerged surface air intake ducts. Also, it is known to provide a jet aircraft engine inlet boundary layer removal apparatus in the form of a splitter plow arrangement positioned at the inlet to the jet engine.

SUMMARY OF THE INVENTION

It is a primary object of the invention described and claimed herein to provide a hood mounted engine air intake apparatus which takes in the required engine airflow with maximum flow efficiency and minimum vehicle aerodynamic drag penalty.

Another primary object of the invention is to provide an engine air intake apparatus which prevents surface water from entering the hood duct and removes the majority of airborne water from the air stream entering the hood duct.

The foregoing objects are specifically met in an engine air intake apparatus comprising a planar base plate member incorporating a curved duct having an inner wall which lies in the plane of the base member initially and then curves inwardly thereinto to blend into an outlet generally perpendicular to the base member which opens to the hood duct. The rear and side walls of the duct are generally perpendicular to the base plate and the duct cross-section expands gradually from the entrance thereto to the generally perpendicular section of the duct, the latter portion being covered by a cover plate disposed slightly above the plane of the base plate member at the trailing end portion thereof, the cover plate providing sound suppression and preventing spillage from the duct over the rear wall thereof. When the intake apparatus is mounted to the hood of a vehicle, the leading edge of the base plate member is elevated somewhat above the level of the hood to permit a leading end splitter plow arrangement disposed in undercut relation therebeneath to channel hood surface water flowing along the hood around the intake and thereby prevent the surface water from entering the air stream. Within the duct, a separator plate and drain located at the trailing end of the duct are provided for collecting airborne water particles thereon which are thrown out of the air stream by centrifugal force as the air stream negotiates the inward turn through the intake and eliminating the water particles from within the apparatus.

BRIEF DESCRIPTION OF THE DRAWINGS

Other objects and advantages of the invention will become more apparent upon a perusal of the detailed description thereof and upon reference to the drawings, in which:

FIG. 4 is a perspective view of a hood duct air apparatus of a truck, the truck and hood skin being illustrated in phantom, showing the engine air intake apparatus of the present invention incorporated into the hood duct air apparatus for supplying air to an engine.

DESCRIPTION OF THE PREFERRED EMBODIMENT

Figure 1:
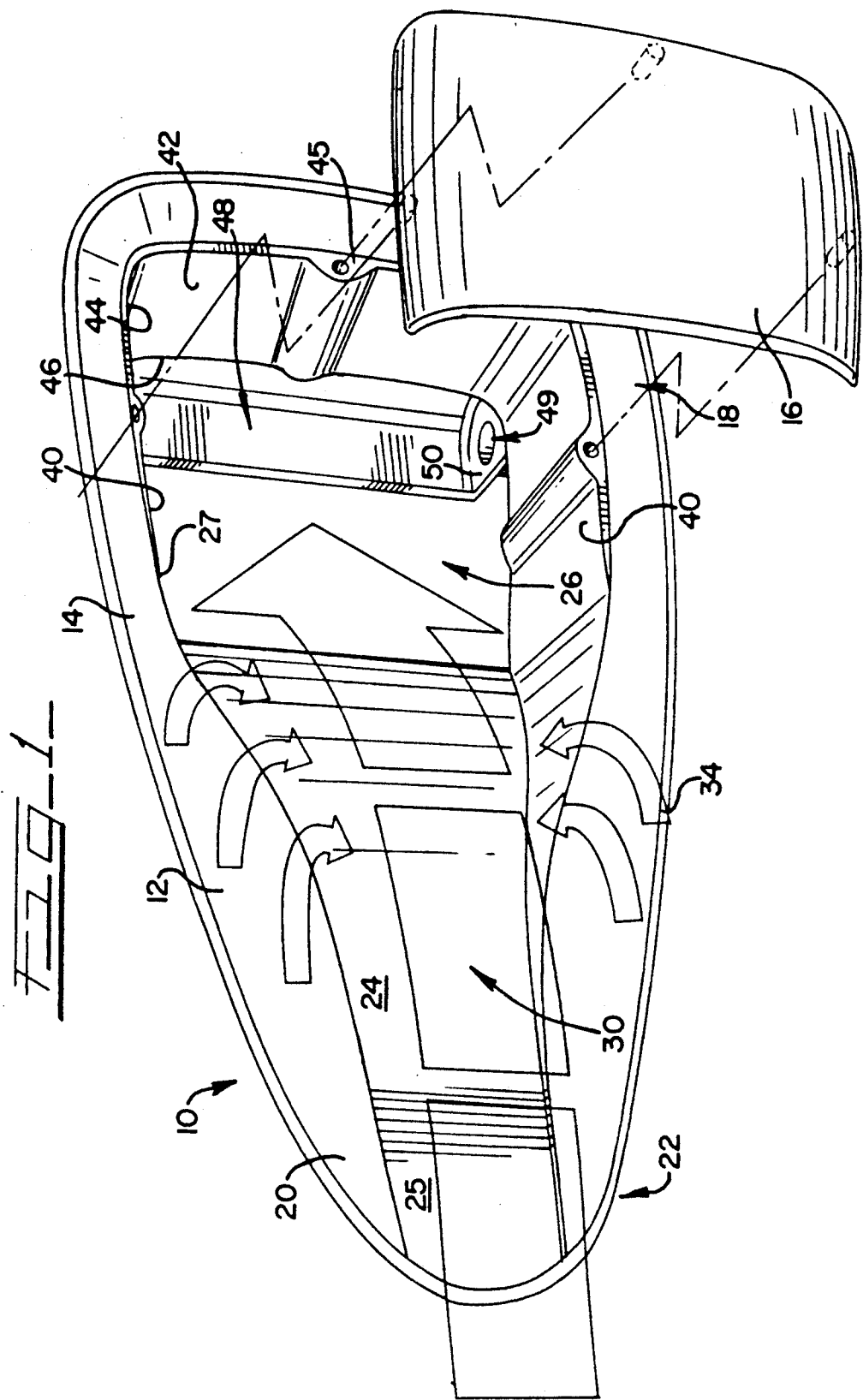
FIG. 1 is an exploded perspective exterior view of the engine air intake apparatus of the present invention showing the cover plate of the apparatus removed therefrom.

Referring now to the drawings in greater detail, there is illustrated in FIG. 1 the engine air intake apparatus 10 of the present invention. The apparatus 10 includes a somewhat wedge-shaped planar base plate 12 including a peripheral lip or flange 14 and a cover plate 16 which attaches to and extends over a rear portion 18 of an outwardly disposed surface 20 of the base plate 12 within the margins defined by the flange 14. Molded into the outwardly disposed surface 20 of the base plate 12 is a duct 24 of a configuration similar to the NACA duct described in the NACA paper mentioned above having a lower curved wall 25 which originates in the plane of the base plate 12 adjacent the leading end portion 22 thereof and then curves continuously inwardly with an continually decreasing radius of curvature through the intake apparatus 10 to an opening 27 generally perpendicular to the base plate 12 into a hood air duct apparatus of a vehicle (FIG. 4) which provides intake air to an engine of the vehicle, as will be described hereinafter. The duct 24 and cover plate 16 define a cavity or chamber 26 therebetween which captures external free stream airflow, and turns the airflow from a direction parallel to the base plate to a direction generally perpendicular to the base plate.

As illustrated by the arrow 30, external free stream airflow impinges on the leading end portion 22 of the base plate 12 and follows the curve of the inner duct wall 25 into the chamber 26. The mechanism by which the free stream airflow is induced to follow the curve of the inner duct wall 25 is the vortices defined by arrows 34 which sweep a portion of the inner duct wall 25 boundary layer sideways and induce free stream air flow to spill over the sidewalls 40 extending between the base member 12 and the inner duct wall 25. The side walls 40 of the submerged entrance portion of the duct 24 are perpendicular to the inner duct wall 25 and diverge in a convexly curved manner from the duct entrance to the entrance to chamber 26 at the rear portion of the intake apparatus at which point the curvature reverses to blend into the chamber walls. The divergence of the duct walls allows free expansion of the flow thus slowing the flow and allowing maximum pressure recovery to a high pressure in the hood duct.

The chamber 26 is formed by the inwardly curved rear end of the duct wall 25 and side and back walls 40 and 42 respectively which depend generally perpendicularly from the base plate 12 along an inner peripheral edge 44 of the outwardly disposed surface 20 of the base plate 12 to the opening 27. Each of the walls 40, 42 is seen to include bosses 45 which are used for mounting the cover plate 16 over the rear portion 18 of the base plate 12.

Figure 2:
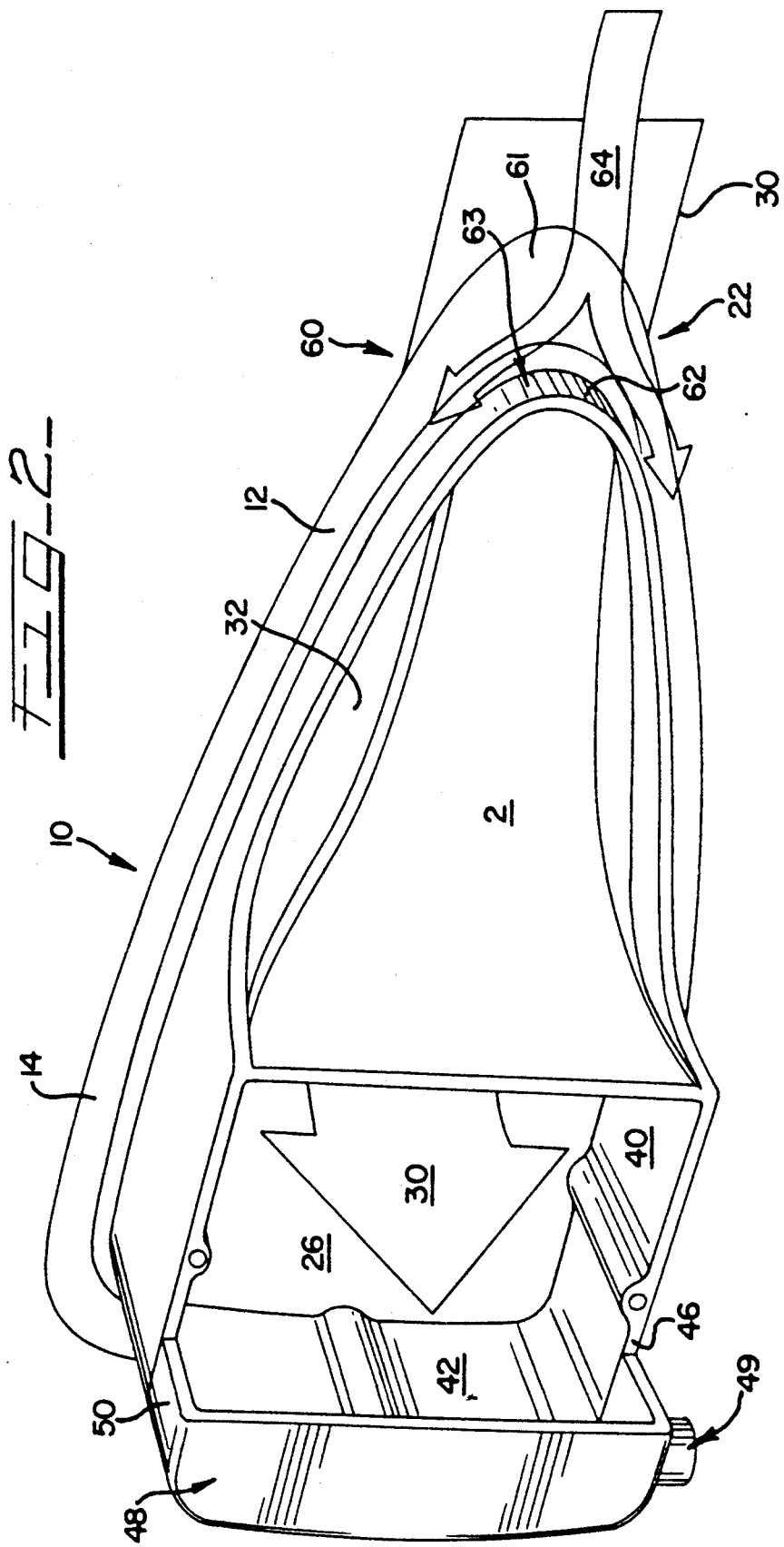
FIG. 2 is a perspective view of the inward facing side engine air intake apparatus of the present invention.
Figure 3:
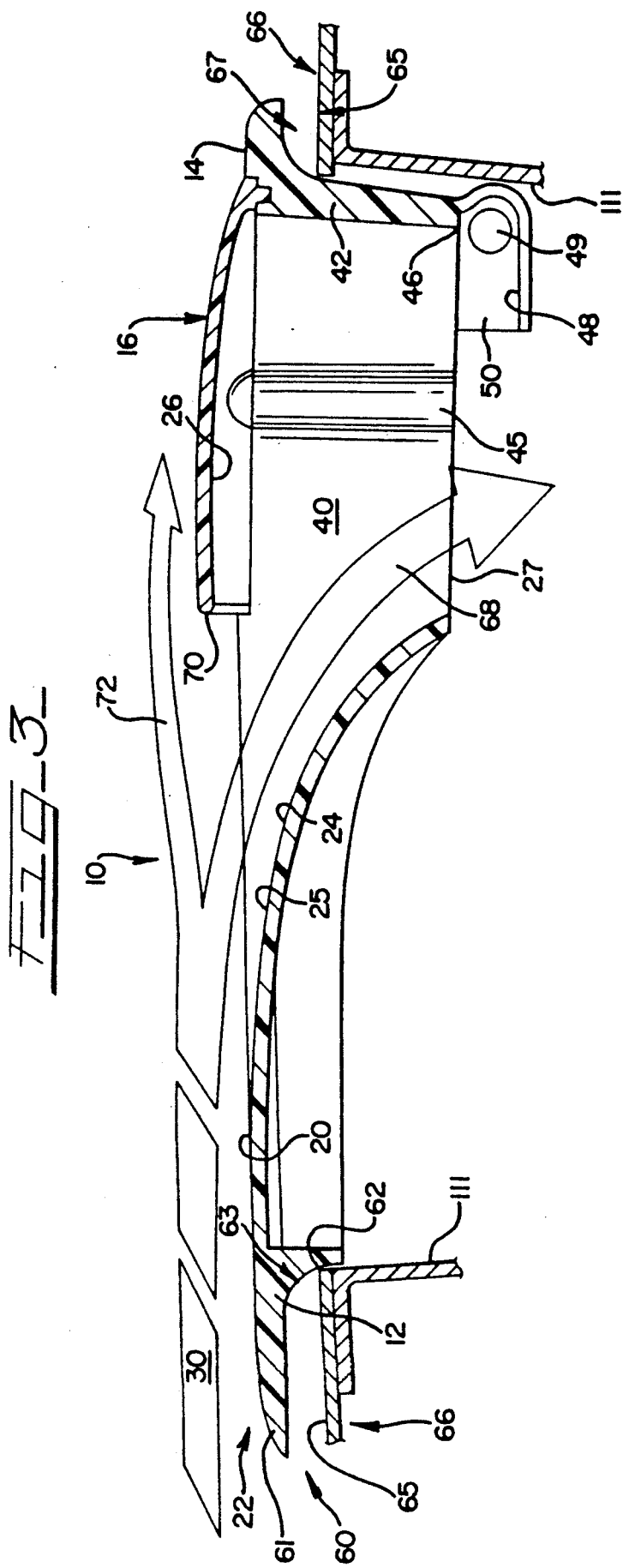
FIG. 3 is a cross section of the engine air intake apparatus of the FIG. 1 together with a portion of a vehicle hood to which it is mounted.

As best seen in FIGS. 2 and 3, adjacent the bottom rear end edge 46 of chamber 26, the intake apparatus 10 is provided with a separator wall 48 extending partially across opening 27 a short distance. The separator wall 48 is seen to lie in a plane perpendicular to the path of the air stream 30. The separator wall 48 is suspended by the supporting wall 50 which depends from the bottom rear end edge 46 of the walls 40 and 42. The drain opening or port 49 is provided in a portion of the supporting wall 50 which will be downwardly directed when the apparatus 10 is mounted appropriately on the hood. Thus, when airborne water particles are thrown out of the airstream onto the separator wall 48 by centrifugal force as the airflow stream 30 negotiates the inward turn through duct 24, chamber 26, and outlet 27, they will collect on the separator wall and be directed toward the drain port 49 and by gravity will be eliminated from the intake apparatus 10.

A further water removal device 60 of the apparatus 10 for preventing surface water on the surface of the hood from entering intake duct 24 is incorporated into the intake apparatus 10. As best seen in FIGS. 2 and 3, the flange 14 of the base plate 12 protrudes significantly outwardly of the body of the intake apparatus to define a significantly forwardly extending splitter plate portion 61 terminating in a peripheral wall 62 depending inwardly from the base plate 12 to mate with the hood duct, the splitter plate 61, hood surface 65 and peripheral wall 62 defining a hood surface water removal plow 60 therebetween having an arcuate surface of relatively low radius of curvature to define its leading edge 63. The splitter plate 61 and plow 60 serve to entrap and channel surface water along the hood surface around the intake apparatus 10 as illustrated by the arrow 64 and thus prevent such surface water from entering the duct 24.

As shown in FIG. 3, the splitter plate 61 is spaced above the outer surface 65 of vehicle hood 66 on which the apparatus 10 is to be mounted by between ¼ and ⅜ of an inch. The water removal plow leading 63 directs the hood surface water along both sides of the intake apparatus 10 beneath the splitter plate 61 toward trailing edges 67 and away from the air inlet duct 24. The water particles reaching the trailing edge 67 of the apparatus 10 are thrown off and carried away by the air stream along the hood surface 65.

In summary, as illustrated by the arrow 30, the airflow first crosses the splitter plate portion 61, which prevents surface water from becoming entrained in the air stream, and then follows the outwardly disposed surface 20 of the base plate 12 into the duct 24 where it follows the curvature of the inner duct wall 25 until it reaches the chamber 26 whereat the airstream is turned to nearly 90° to the plane of the base member 12, as illustrated by the arrow 68. Also, an upper portion of the air stream encounters a forward lip 70 of the cover plate 16 of the apparatus 10 which splits the air stream into a downward branch 68 which ultimately enters the engine air intake and a rearward branch 72 which passes over the cover plate.

Following the flow of air along the arrow 68, which curves along the duct 24, following the curvature of lower duct wall 25, the duct 24 has positioned therein, at the trailing end of the curve, a water separator device 48 which catches airborne water particles thrown off the air stream 68 by centrifugal force applied to the air stream 68 as it turns along the duct 24. The water separator device 48 along a supporting wall 50 thereof is provided with a drain port 49 through which the water particles are eliminated. It is to be understood that the drain port 49 is to be provided in a supporting wall 50 which will be downwardly disposed when the apparatus 10 is mounted on the hood 66 of the vehicle.

Thus, surface water has been prevented from entering the air stream 30 entering the apparatus 10 by the hood surface water removal splitter plow 60 located at the leading end 22 of the apparatus 10 and airborne water particles have been removed from the air stream 68 as described above, to provide a minimum moisture air stream 68 to the hood duct apparatus (FIG. 4) of the engine (not shown) of the vehicle via the engine air intake apparatus 10.

FIG. 4 illustrates the incorporation of the engine air intake apparatus 10 into the hood engine air duct 100 of a vehicle 110 (shown in phantom), such as a truck. As shown, the apparatus 10 is positioned within an opening 111 (FIG. 3) formed in the side 112 of the hood 66 of the vehicle 110, the opening 111 merging with one branch 114 of the hood duct air intake apparatus 100. As shown by the paths marked out by arrows 120, air which is travelling across the base plate 12 of the apparatus 10 is trapped between the base plate 12 and the cover plate 16 and is shunted along the duct 24 around a 90° turn into the branch 114 of the hood duct air intake apparatus 100. Before entering the hood duct 114, water particles which may be in the air, depending on road and weather conditions, have been removed and hood surface water prevented from entering by the leading splitter plow arrangement 60 and by the provision of the suspended particle separator wall 48.

As described above, the hood air intake apparatus of the present invention provides numerous advantages, some of which have been described above, and others of which are inherent in the invention. Also, modifications to the described embodiment may be made without departing from the teachings of the invention. For instance, although the apparatus 10 is shown in FIG. 3 as being mounted in the side wall 112 of a vehicle hood, the air intake apparatus could be mounted in the top wall of the hood, with the water separator wall 48 sloped and the drain hole 49 relocated to allow proper drainage, or in a cab wall. Accordingly, the scope of the invention is only to be limited as necessitated by the accompanying claims.

I claim:

1. An engine air intake apparatus for use with a truck having a hood incorporating an engine air hood duct for providing an air flow stream to an engine of the truck comprising:

a planar base member having an outer surface;

a curved duct partially defined by an inner longitudinally extending wall which lies in the plane of the base member outer surface initially at an entrance adjacent a leading end thereof and then curves inwardly into said intake apparatus to an opening, said curved duct further being defined by side and rear walls depending inwardly from said base member;

mounting wall means formed with said base member for mounting said planar base member to said hood in a manner assuring fluid communication between the curved duct opening and said hood duct and with said planar base member being spaced adjacently above said hood surface;

a cover plate attached to said planar base member which seats onto and over a trailing end portion of the base plate member over the inwardly curved portion of the duct, said cover plate having a leading lip disposed adjacently above the plane of the base plate member;

said planar base member having a flange overhanging said mounting wall means and further incorporating a splitter plow arrangement at said leading end thereof between said base member flange and said hood surface to prevent hood surface water from entering said air flow stream; and a water particle separator wall disposed transversely to said air stream on said rear wall adjacent said opening for capturing water particles thrown off by the air flow stream as it negotiates said curved duct and eliminating said water particles from said apparatus.

2. The apparatus of claim 1 wherein the side walls of said curved duct diverge rearwardly from said leading edge entrance thereto to a width equal to said opening.

3. The apparatus of claim 2 wherein said air stream in said curved duct is turned approximately 90°.

4. The apparatus of claim 1 wherein said cover plate is substantially planar.

5. The apparatus of claim 4 wherein said splitter plow arrangement includes a depending wall portion for splitting the air gap along the hood surface beneath said flange.

6. The apparatus of claim 5 wherein said water particle separator wall is mounted by support walls to a trailing end edge of said duct and a drain port disposed in one of said support walls.

7. The apparatus of claim 6 wherein said drain port is provided in said support wall which will be the bottom wall when said apparatus is appropriately mounted.

8. An engine air intake apparatus comprising a base member having a planar plate portion and incorporating a duct inlet which lies in the plane of said plate portion initially along a leading end thereof and then curves inwardly therethrough, said inwardly curved portion of said duct lying toward a trailing edge of the base member and being covered by a cover plate member which seats onto and over the trailing end portion of said base member in a parallel plane slightly above the plane of said plate portion, said base member including leading end splitter plow means disposed adjacent said plate portion on a side thereof opposite said duct inlet for channelling surface water flowing therealong away from said duct inlet and said duct incorporating a secondary water removal apparatus comprising an interior separator wall and drain port at the trailing end of the curve within the duct for collecting airborne water particles thereon which are thrown off the air stream by centrifugal force as the air stream negotiates the curve and for eliminating the water particles from within the apparatus.

9. The apparatus of claim 8 wherein said curve in said duct extends around approximately 90°.

10. The apparatus of claim 9 wherein said cover plate is substantially planar.

11. The apparatus of claim 10 wherein said splitter plow means includes a forwardly protruding flange formed by said plate portion and a wedge-shaped wall portion depending from said plate portion for splitting the air flow along said base member beneath said flange.

12. The apparatus of claim 11 wherein said water particle separator includes a separator wall which is mounted by support walls to a trailing end edge of said duct so as to lie in a plane transverse to the plane of air flow along an outer side of said curve and wherein a drain port is provided in one of said support walls.

13. The apparatus of claim 12 wherein said drain port is provided in said support wall which will be the bottom wall when said apparatus is appropriately mounted.

14. In combination with a truck hood incorporating an engine air hood duct for providing an air flow stream to an engine of the truck, an intake apparatus comprising:

a planar base member mounted to said truck hood and having an outer surface, said planar base member being spaced adjacently parallelly above said hood surface;

said planar base member having an undercut lower surface defining an overhanging flange disposed about the leading periphery of said base member;

a splitter plow arrangement disposed between said flange and the exterior surface of said truck hood at a leading end of said base member to prevent hood surface water from entering said air flow stream; and a duct through said base member opening to said outer surface, said duct being in fluid communication with said hood duct.

15. The invention in accordance with claim 14 and said duct being curved within said base member to turn an air stream normal to the direction of travel and a water particle separator wall disposed within said duct on a rear wall thereof adjacent an opening to said hood duct for capturing water particles thrown off by the air flow stream as it negotiates said curved duct.

16. In combination with a truck hood having an engine air inlet duct, an air intake apparatus comprising a planar base plate member mounted to an exterior surface of said hood, said planar base plate member having an undercut lower surface defining an overhanging flange disposed about the leading periphery of said base member and spaced from said exterior hood surface, said planar base plate member incorporating a duct inlet having a lower wall which lies in the plane of the base plate member initially along a leading end thereof and then curves inwardly therethrough, said inwardly curved portion of said duct wall lying toward a trailing edge of the base plate member and being covered by a cover plate member which seats onto and over the trailing end portion of said base plate member in a parallel plane slightly above the plane of the base plate member, said side walls of said duct diverging toward the trailing edge of said duct, and means establishing fluid communication between said duct and said hood duct.

17. The invention in accordance with claim 16 and said duct incorporating a water removal apparatus comprising an interior separator wall and drain port at the trailing end of the curve within the duct for collecting airborne water particles thereon which are thrown off the air stream by centrifugal force as the air stream negotiates the curve and for eliminating the water particles from within the apparatus.

* * * * *